United States Patent

[11] 3,589,828

[72] Inventor David Mosimann
Clos du Lac 3, Bienne (canton of Berne), Switzerland
[21] Appl. No. 837,463
[22] Filed June 30, 1969
[45] Patented June 29, 1971
[32] Priority July 1, 1968
[33] Switzerland
[31] 9777/68

[54] HAND-PIECE OF DENTISTRY WITH AN AIR-DRIVEN TURBINE
3 Claims, 2 Drawing Figs.

[52] U.S. Cl. .................................. 415/112, 415/503, 308/9
[51] Int. Cl. ....................................... F01d 11/00, F03b 13/04
[50] Field of Search .......................... 415/112, 119, 503; 308/9, 26; 277/59, 205; 32/27, DIG. 1

[56] References Cited
UNITED STATES PATENTS

| 3,088,707 | 5/1963 | Williams et al. | 31/27 |
| Re.25,964 | 2/1966 | Williams et al. | 32/27 |
| 2,948,554 | 8/1960 | Mahand | 277/205 |
| 3,147,015 | 9/1964 | Hanback | 277/205 |
| 3,268,205 | 8/1966 | Allen et al. | 415/112 |
| 3,451,134 | 6/1969 | Erickson et al. | 415/503 |
| 3,493,235 | 2/1970 | Pautz et al. | 277/59 |

FOREIGN PATENTS

| 14,062 | 1905 | Great Britain | 308/9 |

Primary Examiner—Henry F. Raduazo
Attorney—Stevens, Davis, Miller & Mosher

ABSTRACT: The air-driven rotor of the turbine is journaled at its two ends in air bearings comprising floating sleeves. These sleeves are supported within the cylindrical wall of a housing of the hand-piece by means of inflated plastic shells, each composed of two annular parts having a V-shaped cross section. Air under pressure is supplied simultaneously for inflating the shells and to the air bearings by derivative conduits of the main conduit supplying the turbine with the driving air jet.

PATENTED JUN 29 1971 3,589,828

HAND-PIECE OF DENTISTRY WITH AN AIR-DRIVEN TURBINE

BACKGROUND OF THE INVENTION

1. Field of the Invention

This invention relates to air-driven dental turbines for handpieces and in particular to dental turbines having, on either side of the bucket-wheel of the rotor, an air bearing comprising a floating sleeve for the distribution of air under pressure to the bearing, said floating sleeve being held in a housing by means of a pair of yielding gaskets located between the sleeve and the sidewall of the housing, on either side of a central air-supply conduit.

2. Description of the Prior Art

With the known turbines of this type each floating sleeve is supported by two gaskets having a circular cross section. In order that these gaskets operate in the desired manner, namely so as to permit the two floating sleeves serving as bearings for the turbine rotor of automatically aligning themselves relative to each other and the noise produced by the turbine rotor of being substantially muffled, the gaskets have to be made out of a very soft material.

However, the last condition has several drawbacks. First of all, manufacturing gaskets out of such a material with precise sizes is relatively difficult. Moreover, gaskets made out of a soft material do not well withstand subjection to a relatively high temperature so that the turbine cannot be sterilized by heating to the required extent. Since the gaskets of the known turbines are furthermore subjected to a pressure when the sleeves supported by them move in a transverse direction, the surfaces between which the gaskets are located have to be manufactured with a very great precision or else the gaskets would hold the corresponding sleeves in such positions that these sleeves would not be aligned with respect to each other. Finally, these gaskets obviously do not permit the stiffness of the suspension of the sleeves serving as bearings for the turbine rotor to be modified.

SUMMARY OF THE INVENTION

The main object of this invention is to provide a turbine of the type indicated above while avoiding the above-mentioned drawbacks.

With the turbine improved according to the invention the floating sleeves of the air bearings of the turbine rotor are supported within the housing of the hand-piece by means of inflated plastic shells. Each shell is advantageously composed of two annular parts, each having a V-shaped cross section. Each shell part is, moreover, set in such a position that one of its flanges bears on the floating sleeve while the other flange bears against the sidewall of the hand-piece housing, the free spaces comprised between the flanges of the two shell parts holding each of said sleeves thereby being directed toward each other.

Further objects of the invention will become apparent in the course of the following description.

BRIEF DESCRIPTION OF THE DRAWING

One embodiment of the turbine improved according to the invention is represented diagrammatically and by way of example in the accompanying drawings.

In the drawings.

DESCRIPTION OF THE PREFERRED EMBODIMENT

Figure 1:
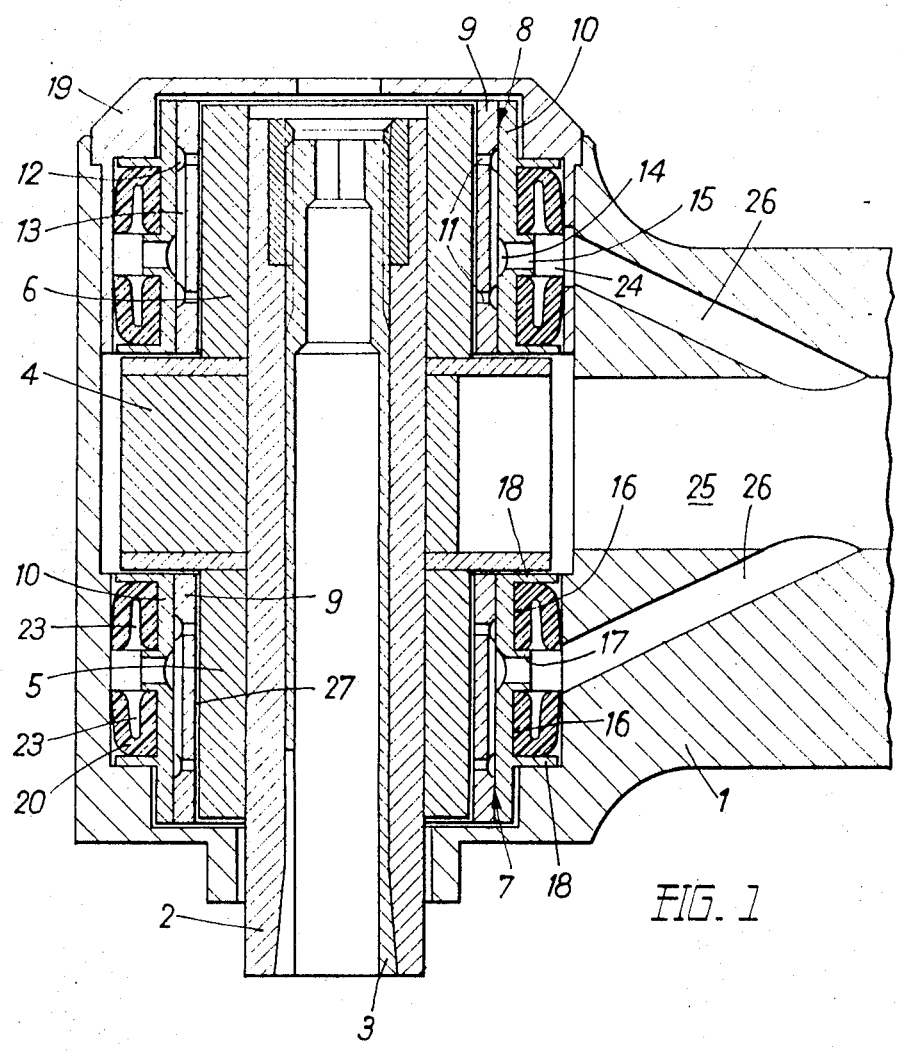
FIG. 1 is an axial section of the turbine.

In the embodiment represented in the drawings the turbine is mounted in the contra-angle (only the head 1 of which has been represented in FIG. 1) which is secured to the handle of the hand-piece for receiving the different rotatory tools used by the dentists. The turbine rotor firstly comprises a spindle 2 carrying a chuck 3 arranged for gripping the different tools usually employed with this type of instrument (milling-cutters, grinding tools, etc.). A bucket-wheel 4 of usual shape is set on spindle 2 as well as two sleeves 5 and 6 carrying the bearing surfaces by means of which the turbine rotor is journaled within the contra-angle of the hand-piece. The three members 4, 5 and 6 are set on spindle 2 in such a manner as to form a single unit therewith. A stationary sleeve 7, 8 surrounds each rotatory sleeve 5, 6. Each stationary sleeve 7, 8 comprises two cylindrical pieces 9, 10 set with force fit into one another. Pairs of bores 11 are provided through piece 9 at places regularly staggered around the axis thereof. The corresponding bores 11 of each one of these pairs open in two annular grooves 12 provided in the outer surface of piece 9. Axial grooves 13 provided in the same surface of piece 9 provide for a communication between the two annular grooves 12. The outer piece 10 of each sleeve 7, 8 is provided with an annular groove 14 in its inner surface, which communicates with the axial grooves 13 of piece 9. Groove 14, in turn, communicates with the outer surface of piece 10 by some bores 15 provided through the wall of piece 10. Two grooves 16 are finally provided in such a manner in the outer surface of sleeve 10 that an annular rim 17 remains therebetween. Bores 15 open in the outer surface of rim 17 and grooves 16 leave flanges 18 near the ends of piece 10. Each sleeve 7, 8 thus includes a manifold having inlet openings 15 and outlet openings 11 for distributing the air of the air bearings.

The turbine rotor as well as sleeves 7 and 8 are located in a housing of head 1 having a substantially cylindrical sidewall. Head 1 thus serves as a support for the turbine rotor and its air bearings which are axially held in place in head 1 by a cover member 19 set with force fit in head 1 to which it is definitely secured.

FIG. 1 shows that the sleeves 7 and 8 have a free play in an axial as well as in a transverse direction between the turbine rotor and head 1. Sleeves 7 and 8 are accordingly floating and are thus able to take the convenient position between the turbine rotor and its housing. A shell part 20 is inserted in each of the two grooves 16 of sleeves 7 and 8.

Figure 2:
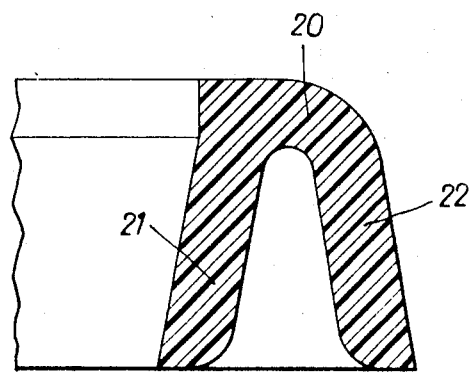
FIG. 2 is a partial cross-sectional view on a larger scale of a part of the turbine represented in FIG. 1.

In the rest position, which is represented in FIG. 2, each shell part 20 has a V-shaped cross section and thus comprises an inner flange 21 and an outer flange 22. When parts 20 are set in place, their flanges 21 and 22 firmly bear against the bottom of grooves 16 and the sidewall of the rotor housing formed in head 1 and including cover member 19. As shown in FIG. 1, shell parts 20 are oriented in such a manner in their corresponding grooves that the free spaces 23 enclosed between the flanges 21, 22 of the two shell parts 20 mounted on the same floating sleeve are directed toward each other. FIG. 1, moreover, shows that the sizes of shell parts 20 are chosen with respect to those of grooves 16 so that their outer flanges 22 leave a free annular space 24 between them, space 24 surrounding rim 17.

The bucket-wheel 4 and the air bearings of the turbine rotor are supplied with air under pressure through the handle of the hand-piece which is provided therefore with a central main conduit 25 as well as with two derivative conduits 26. While the air passing through conduit 25 actuates the bucket-wheel 4, that which passes through the conduit 26 is distributed to the air bearings of the turbine rotor through the manifold (11 to 15) of sleeves 7 and 8, thus forming an air film within the spaces 27 provided between the outer surfaces of sleeves 5 and 6 and the inner surfaces of sleeves 7 and 8.

Since the air supplied by the conduits 26 is under pressure and the annular spaces 24 as well as the free spaces 23 enclosed by the shell part flanges 21, 22, are tightly closed by these flanges, which bear against the sleeves 7 and 8 and the sidewall of the housing of the turbine rotor, the air supplied by conduits 26 produces an inflation of shells 20 which accordingly operate in the same manner as tubeless tires.

In contradistinction to the gaskets of the known turbines which have a circular cross section, the shell parts 20 have the advantage that they are not subjected to a pressing, but to a bending strain. Therefore, they can be made out of a material which is substantially harder. Tests made with materials having a Shore hardness ranging above 90° gave satisfactory results. The resiliency of the flanges of shell parts 20 permits the turbine rotor to be freely floating within head 1, when the turbine is at rest, i.e. when the sleeve-supporting shells are not inflated.

Since the shell parts 20 are made out of a relatively hard material, they can easily be manufactured with precise sizes.

The material of parts 20 can, furthermore, be chosen so that these parts may withstand temperatures ranging up to 260° C. so that the turbine can be sterilized in the usual manner like all the other surgical instruments. "VITON" (registered trademark) gives satisfactory results.

Since the suspension of sleeves 7 and 8 within head 1 is not ensured by the compressibility of parts 20, but by the degree of inflation of the shells, the manufacturing tolerances of sleeves 7 and 8 as well as of the housing provided in head 1 and cover member 19 need not be as narrow as with the known turbines provided with gaskets having a circular cross section.

Finally, the stiffness of the suspension of sleeves 7 and 8 can be modified merely by varying the pressure of the air supplied to the turbine bearings. The dentist thus can modify the stiffness of the suspension of his tool in accordance with the work he intends to carry out therewith.

I claim:

1. In a hand-piece of dentistry, an air-driven turbine comprising, in combination, a housing formed in the hand-piece and including a substantially cylindrical sidewall, a main conduit provided in the hand-piece and extending across said sidewall for supplying the turbine with air under pressure, a rotor adapted for carrying a tool and mounted in said housing within said sidewall for rotating coaxially therein at high speed under the control of the jet of air under pressure supplied by said main conduit, a pair of bearing sleeves located in said housing within said sidewall thereof for journaling said rotor, inflatable plastic shells having openings therein inserted between said bearing sleeves and said sidewall for holding said sleeves radially within said sidewall, each of said plastic shells comprising a pair of annular concave radially supporting parts associated with each of said bearing sleeves and spaced apart axially with said openings in opposing relationship, and a derivative conduit located in the hand-piece connecting said main conduit to the opposing openings of said pair of shell parts, the stiffness of the suspension of said sleeves being modified by varying the pressure of the air supplied through said derivative conduit between said concave radially supporting shell parts.

2. In the hand-piece of claim 1, the rotor of the air-driven turbine being journaled by means of air bearings, each one of said bearing sleeves including a manifold having an inlet opening provided in the outer surface of the bearing sleeve and outlet openings provided in the inner surface of the sleeve for generating, between the bearing sleeve inner surface and the rotor outer surface surrounded by the bearing sleeve, the air film constituting one of the air bearings of said rotor, said plastic shell parts being located in either side of the inlet opening of said manifold, an annular space being thus tightly enclosed by said shell parts, said bearing sleeve and the cylindrical side of said housing, the openings of said plastic shell parts facing said annular space and derivative conduit connecting said main conduit to said annular space.

3. In the hand-piece of claim 2, each part of said inflated plastic shells having a V-shaped cross section and being disposed so as to have one leg of the V-shaped cross section in contact with said bearing sleeve and the other leg in contact with said cylindrical sidewall of the housing, the two parts associated with one bearing sleeve being, moreover, oriented in such a manner that the openings between the two legs of each part are facing each other.